United States Patent

[11] 3,568,929

| [72] | Inventors | Karl Butter<br>Munich;<br>Karl Stöckel, Ottobrunn, Germany |
|---|---|---|
| [21] | Appl. No. | 742,442 |
| [22] | Filed | July 3, 1968 |
| [45] | Patented | Mar. 9, 1971 |
| [73] | Assignee | Bolkow Gesellschaft Mit Beschrankter Haftang<br>Ottobrunn by Munich, Germany |
| [32] | Priority | July 13, 1967 |
| [33] | | Germany |
| [31] | | B93463Ia/46g |

[54] CONNECTING DEVICE FOR A MULTIPART THRUST NOZZLE
12 Claims, 4 Drawing Figs.

[52] U.S. Cl. .................................................. 239/127.1,
239/265.11, 285/18X
[51] Int. Cl. ...................................................... B64d 33/04

[50] Field of Search........................................... 239/265.11
thru 265.43, 127.1, 127.3; 60/(Inquired); 285/18, 100,
101, 102, 106

[56] References Cited
UNITED STATES PATENTS
| 2,712,458 | 7/1955 | Lipson.......................... | 285/101 |
| 3,243,124 | 3/1966 | Lee .............................. | 239/127.1 |
| 3,253,785 | 5/1966 | Watanabee................... | 239/265.15 |

*Primary Examiner* — M. Henson Wood, Jr.
*Assistant Examiner* — John J. Love
*Attorney* — McGlew and Toren ABSTRACT: A connecting device for the separate sections of a thrust nozzle in a rocket construction is made up of members secured to different ones of the thrust nozzle sections and which combine to form a pressure chamber. A fluid pressure medium or spring pressure or a combination of the two may be utilized within the pressure chamber for securing the separate sections together in tightly held interengagement.

INVENTORS
**Karl Butter
Karl Stöckel**

By *[signature]*
ATTORNEYS

INVENTORS
Karl Butter
Karl Stöckel
ATTORNEYS 3,568,929

1

CONNECTING DEVICE FOR A MULTIPART THRUST NOZZLE

SUMMARY OF THE INVENTION

The present invention is directed to a rocket construction having a multipart thrust nozzle attached to a combustion chamber, and more particularly to a connecting device for holding the separate thrust nozzle sections together in tightly held interengagement.

In the rocket art a number of different arrangements are known for securing the thrust nozzle sections and combustion chamber together. By employing multipart construction in rockets, particularly in the combustion chamber and the thrust nozzle it is possible to replace the sections which are exposed to a greater amount of wear during operation without replacing the entire member. As a result, replacement costs are reduced and the replacement operation is simplified. However, such arrangements have problems with respect to high operation stresses due to the manner in which the separate sections are secured together.

One such example is set forth in the German Auslegeschrift 1,235,674 in which the portions of the combustion chamber-thrust nozzle sections which form the outer jacket of the rocket engine are firmly interconnected by a screw connection and a fastening ring while the sections located in the interior of the rocket and which form the neck section of the thrust nozzle are held in place between shoulders on the divergent and convergent sections of thrust nozzle with the sealing rings interposed between the sections. As can be appreciated, this arrangement requires a considerable number of separate components and as a result it is not only expensive in its construction but it is also subject to various operational problems due to the rigid mechanical connections used which have a tendency to loosen up during operation, particularly when extreme temperature differences occur between the components and especially between the inside and outside sections of the combustion chamber and thrust nozzle. Due to this loosening effect, leaks develop and inefficient rocket operation results.

In the French Pat. No. 1,135,050 a combination combustion chamber-thrust nozzle unit is illustrated formed of several components, that is, a combustion chamber secured to a convergent thrust nozzle section, a thrust nozzle neck section and a divergent thrust nozzle section. The various sections are held together by two screw connections with the neck section rigidly connected at one end to the convergent thrust nozzle section by a cap nut and at its other end to the divergent thrust nozzle section part by an internal screw connection. This arrangement does not afford an effective system for the complete range of operating conditions experienced within the rocket.

Accordingly, the primary object of the present invention is to provide an arrangement for interconnecting the separate sections of a thrust nozzle-combustion chamber rocket design which avoids the various disadvantages experienced in past arrangements and which affords a connecting device completely effective for all of the conditions experienced during rocket operation.

Another object of the invention is to supply a connecting device formed of separate members secured to different sections of the thrust nozzle which combine to form at least a part of a pressure chamber wherein the pressure developed on the different members of the connecting device effectively secures the thrust nozzle sections into a tightly held interengagement.

Still, another object of the invention is to employ either a fluid pressure medium or spring pressure or a combination of the two for providing the pressure forces within the chamber for holding the various thrust nozzle sections in interengagement.

Yet, another object of the invention is to provide one member of the connecting device as a ring-shaped piston chamber and another member as a ring-shaped piston fitted within the chamber forming therewith a variable volume chamber wherein either or both a pressure medium and spring means is provided for effecting the interengagement of the nozzle sections.

Moreover, another object of the invention is to employ the coolant fluid flowing through the walls of the thrust nozzle section as the pressure medium within the pressure chamber for effecting the interengagement of the thrust nozzle sections. Alternatively, a separate source of pressurized fluid not associated with the cooling circuit for the combustion chamber-thrust nozzle could be supplied to the pressure chamber for exerting the necessary pressure for attaining interengagement of the thrust nozzle sections.

Still another object of the invention is to utilize a plurality of separate pressure chambers disposed about the circumferential periphery of the thrust nozzle for holding the various sections together.

A further object of the invention is to divide the thrust nozzle into three sections, a convergent portion, a neck portion, and a divergent portion with the connecting device combining with these separate portions to form a pair of circumferentially extending, axially spaced pressure chambers. In this arrangement, communicating passageways are provided between the pressure chambers and the coolant passageways through the inner surface of the thrust nozzle for supplying the required pressure within the chambers for attaining the desired interengagement of the nozzle portions. In addition, spring means may be employed within the pressure chamber for combining with the pressure medium in effecting interengagement of the separate nozzle portions.

Still another object of the invention is to employ split clamps for attaching the individual members of the connecting device to the separate parts of the thrust nozzle.

Yet another object of the invention is to provide a simplified arrangement for interconnecting the various portions of the thrust nozzle which is economically advantageous and affords easy assembly and replacement of the different portions.

Therefore, in one embodiment of the invention the components of the thrust nozzle, that is, the convergent portion secured to the combustion chamber, the thrust nozzle neck portion and the divergent portion, are secured together by a connecting device which is, in effect, a ring cylinder extending completely about the circumferential periphery of thrust nozzle part of the rocket. The ring cylinder contains a ring-shaped piston guided by the wall s of the cylinder and forming therewith a pressure chamber. A hydraulic or pneumatic pressure medium is supplied to the pressure chamber for applying the pressure or force necessary to effectively interconnect the various components of the thrust nozzle. The ring cylinder is secured to one portion of the thrust nozzle while the piston is secured to another and the force exerted within the pressure chamber forces these two sections into tight engagement with the opposite ends of the throat or neck section for achieving the interconnection of the thrust nozzle components. The pressure exerted within the pressure chamber can be varied in accordance with the conditions within the combustion chamber and thrust nozzle of a rocket so that variable operating conditions are accommodated by the connecting device.

Instead of a ring cylinder, it is possible to employ a number of individual connecting devices spaced angularly about the circumferential periphery of the thrust nozzle section, such individual devices being in the form of piston cylinder units. A common source of supply is provided for each of the units so that a uniform tightening effect is achieved for the various components of the thrust nozzle.

In still another embodiment of the invention, the rocket is formed of a combustion chamber secured to the convergent thrust nozzle section, and aligned therewith in serial arrangement are the thrust nozzle neck section and its divergent section. About the periphery of the thrust nozzle two ringlike piston cylinders are provided in axial alignment, one of the piston cylinders sections being secured to the convergent section of the thrust nozzle and to the neck section thereof while the other ring member is secured to the neck section and to the divergent section of the thrust nozzle. Both of these members form pressure chambers containing a spring member for exerting at least a part of the force necessary to interengage the thrust section and the neck section and its adjacent convergent or divergent section. Moreover, passageways are provided through the neck section communicating between the coolant flow passageways through the walls of the thrust nozzle and the pressure chambers for supplying a source of pressurized medium in the chambers. The pressurized medium combines with the spring means for effecting interengagement of the various components of the thrust nozzle. In this arrangement the portion of the piston cylinder secured at one end to the convergent or divergent section is in sliding engagement with the exterior surface of the neck section of the thrust nozzle and forms the movable piston part of the piston cylinder.

As mentioned previously, the coolant fluid passing through the walls of the thrust nozzle is used in the pressure chamber for providing the force necessary to effectuate the tightly held interengagement of separate sections. In liquid fueled rockets this pressure medium may be the liquid oxygen, oxygen carrier or hydrogen employed as the propulsion components.

By means of the present invention the problems posed in interengaging the separate sections of a thrust nozzle-combustion chamber unit for a rocket are effectively solved. Due to the pressure chamber arrangements in the various embodiments disclosed, the connecting device is adjustable and controllable over the range of conditions occurring within the rocket combustion chamber and thrust nozzle. Further, when the pressure medium used is one of liquid components utilized in the rocket combustion chamber for affording propulsion, the interconnection is self-regulating because the operating pressure of the components is proportional to the operating stresses occurring in the combustion chamber-thrust nozzle unit. Additionally, the connection provided is operationally reliable because unlike the known screw-type connections, it is not exposed to localized heat distortions and is capable of absorbing the variations in pressure and temperature without any harmful results. Moreover, the disposition of the connection assures for the easy exchangeability of the components forming the combustion chamber-thrust nozzle unit. The simplicity of the arrangement, in turn, affords simplicity in the design and manufacture of the various components of the combustion chamber-thrust nozzle unit of the rocket.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
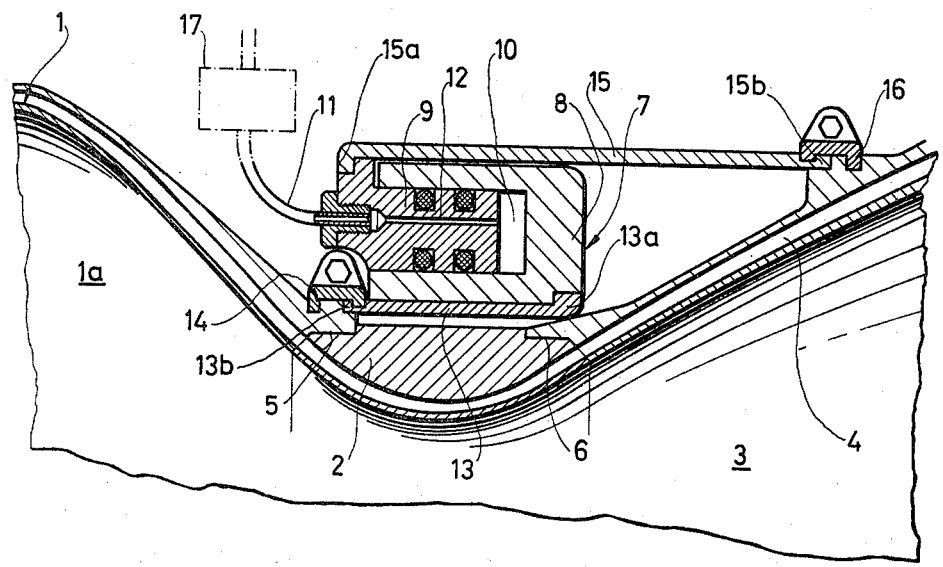
FIG. 1 is a partial longitudinal sectional view of a combustion chamber-thrust nozzle unit for a rocket illustrating one embodiment of the present invention.

In the drawings, similar parts have the same reference numerals.

In FIG. 1, the combustion chamber-thrust nozzle unit of a rocket is shown comprised of the combined combustion chamber 1 and convergent thrust nozzle section 1a, a neck section 2 of the thrust nozzle and a divergent section 3 of the thrust nozzle. The inner surface of the combustion chamber-thrust nozzle is provided with a plurality of coolant channels 4 through which a liquid fuel component employed by the rocket is circulated for effectively cooling the interior surface of these sections. The oppositely disposed end portions of the neck section of the thrust nozzle have a stepped configuration for interlocking engagement with the adjacent surfaces of the convergent and divergent sections of the joints 5,6. Moreover, the disposition of the surfaces forming the joints 5, 6 are designed to provide a centering effect.

To interengage the various sections of the thrust nozzle, a tightening or connecting device 7 is provided which extends circumferentially about the exterior portion of the neck section 2 of the thrust nozzle. In the arrangement shown in FIG. 1, the connecting device forms a pressure chamber 10 into which a pressure medium, such as a hydraulic fluid, is charged for providing the required force or pressure interengaging the various sections of the thrust nozzle. The connecting device is formed of a circumferentially extending ring cylinder 8 and a ring piston 9 fitted within the ring cylinder and combining with it to form the annular-shaped pressure chamber 10.

The pressure medium is supplied through a line 11 connected to a passageway 12 extending axially through the ring piston into the pressure chamber 10.

The ring cylinder 8 is connected to the convergent section 1a of the thrust nozzle by means of the sleeve 13. The opposite ends of the sleeve 13 have a hooked configuration, one end 13a fits into a recess in the ring cylinder 8 and the other end 13b is hooked into a groove formed in a split clamp 14 secured to the exterior of the convergent section 1a. In turn, the ring piston 9 is connected to the divergent section 3 by means of a sleeve 15 disposed radially outwardly from the sleeve 13. One end 15a of the sleeve 15 has a hook-shaped configuration fitting into a recess in the end of the piston 9 and its opposite end 15b has a similar hook-shaped configuration fitting within a groove in a split clamp 16 secured to the exterior surface of the divergent section 3. During operation, the pressure medium is supplied to chamber 10 from a source 17, which includes a pressure regulator, through line 11 and passageway 12. As pressure is exerted within the chamber 10 on the piston 9 and the opposed surface of the ring cylinder 8, these opposed surfaces are urged apart and through the medium of the sleeves 13 and 15, the connecting device 7 operates to pull the divergent and convergent sections of the thrust nozzle into tight engagement with the neck section at the joints 5,6.

Figure 2:
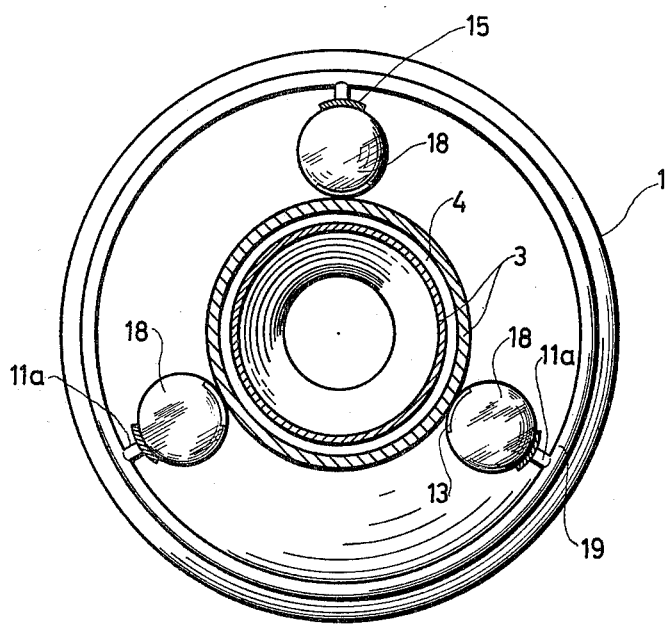
FIG. 2 is a transverse view of a combustion chamber thrust nozzle unit indicating another embodiment of the present invention.

In FIG. 2, as an alternative to the ring cylinder disposed about the circumference of the neck section of the thrust nozzle, three connecting devices are provided in the form of cylinder piston units 18 with pressure medium lines 11a supplied form a common ring-shaped line 19. The cylinder piston units are secured to the convergent and divergent sections by means of connector members 13,15. Since the pressure medium is supplied to the units 18 from a common source, uniformity of operation of the three units is achieved and effective interengagement can be provided between the various sections of the thrust nozzle in a manner generally similar to that disclosed in FIG. 1.

Figure 3:
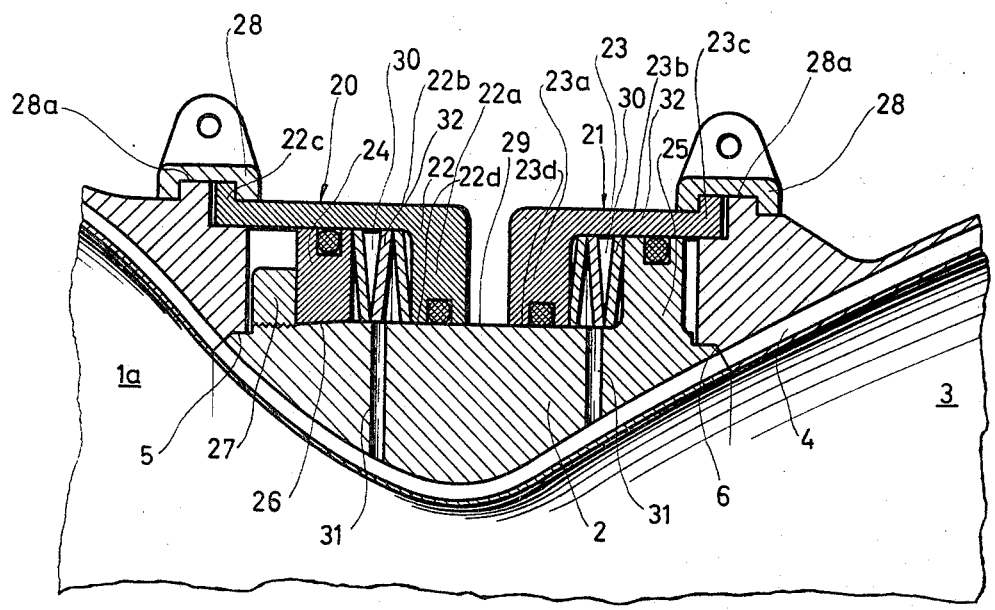

In the embodiment of the invention shown in FIG. 3, the sections of the thrust nozzle are interconnected by means of two connecting devices 20, 21 extending about the circumferential periphery of the neck section 2 and spaced one from the other in the axial direction of the thrust nozzle. Each of the connecting devices 21, 20 is formed of an annular piston member 22,23 having an L-shaped cross section. The shorter leg 22a, 23a of the L-shaped section extends radially outwardly from and in sliding engagement with the outer surface 29 of the neck section 2 of the thrust nozzle. The longer legs 22b, 23b of the members 22, 23 extend in opposite directions from the shorter legs and in parallel relationship with the axis of the thrust nozzle.

In the connecting device 20 which extends between the neck section 2 and the convergent section 1a of the thrust nozzle, a ring collar 24 is mounted on a frustoconically shaped surface 26 of the thrust nozzle and is secured in place by a threaded nut 27 engaged on the exterior surface of the neck section. However, the connecting device 21 which extends between the neck section 2 and the divergent section 3 has a ring collar 25 which is formed as an integral part of the neck section 2. The longer legs 22b, 23b of the ring members 22, 23 have hook-shaped ends 22c, 23c, respectively, which fit into grooves 28a in split clamps 28 secured to convergent and divergent sections of the thrust nozzle respectively. The opposite ends 22d, 23d of the ring members 22, 23, that is, the radially inward ends of the shorter legs 22a, 23a, are mounted in sliding engagement on the cylindrical surface 29 of the section 2.

The surface of the ring collar 24 facing the divergent section 3, the adjacent inwardly facing surfaces of the ring member 22, and the outer surface of the neck section 2 form a pressure chamber 30. A similar pressure chamber 30 is formed between the surface of the ring collar 25 facing toward the convergent section 1a, the adjacent inwardly facing surfaces of the ring member 23, and the outer surface of the neck section 2. Passageways 31 extend from the coolant passageway 4 located along the interior surface of the thrust nozzle outwardly to the pressure chambers 30 for supplying a pressure medium thereto. In addition, spring members 32 are provided within the pressure chamber 30 for effecting a preloaded arrangement between the neck section and the adjacent convergent or divergent sections of the thrust nozzle. During operation as the conditions or stresses vary within the combustion chamber and thrust nozzle, the pressure medium varies the pressure within the chamber 30 for effectively interengaging the different sections of the thrust nozzle. Basically, the springs 32 are employed for holding the sections of the thrust nozzle and combustion chamber in position when the unit is not in operation. However, it is fully within the scope of the invention to employ only the compression spring, approximately dimensioned, for attaining the required tightening forces for interengaging the different sections of the thrust nozzle.

When pressure is exerted with the chambers 30 in FIG. 3, the legs 22a, 23a are urged toward one another placing the legs 22b, 23b under tension and forcing the convergent and divergent sections into tightly fitting interengagement with the neck section 2.

Figure 4:
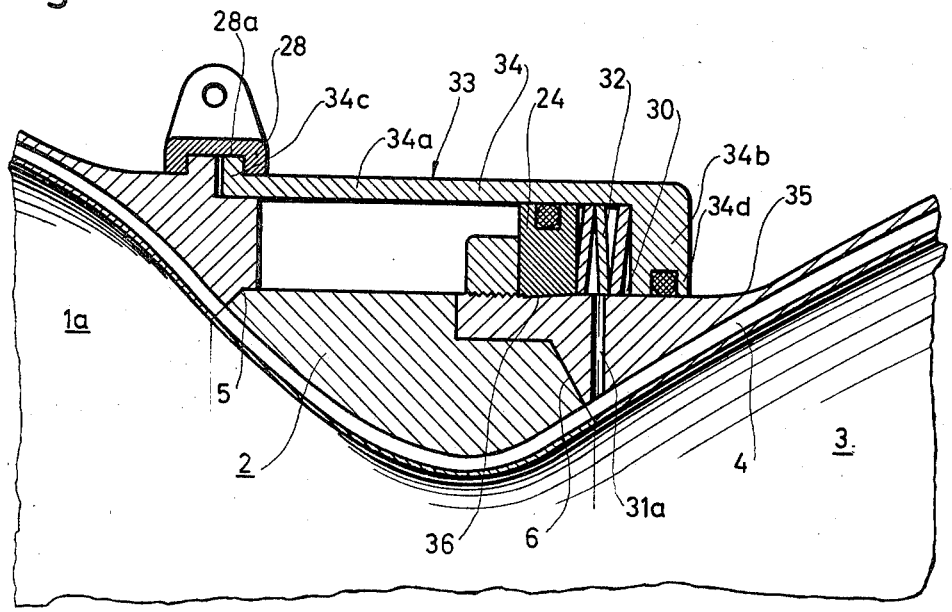
FIG. 4 is a partial longitudinal sectional view similar to that in FIGS. 1 and 3 showing a still further embodiment of the connecting device of the present invention.

In FIG. 4 an alternate embodiment is shown which uses only the connecting device 20 shown in FIG. 3. The opposite ends of the neck section are shaped to interfit into the adjacent surfaces of the convergent and divergent sections of the joints 5,6. In this arrangement a single connecting device 33 is employed formed of a ring member 34 having an L-shaped cross section. The ring member 34 has an axially extending leg 34a and a radially extending leg 34b which at its inner surface 34d rests in sliding engagement against the surface 35 of the divergent section 3 of the thrust nozzle.

The axially extending leg 34a has a hook-shaped end 34c engaged within a groove 28a in a split clamp 28. The clamp 28 is secured to the convergent section 1a.

Disposed within the ring member 34 is a ring collar 24 mounted on the frustoconically shaped surface 36 of the divergent section 3. A threaded nut 27 is secured to the divergent section and holds the ring collar 24 in place.

The stationary ring collar 24 forms in combination with the interior surfaces of the ring member 34 and the exterior surfaces of the divergent section 2 a pressure chamber 30, which communicates through the passageway 31a with the coolant duct 4. A preloaded compression spring 32 is situated within the chamber for effecting the positioning of the components of the connecting device when the combustion chamber-thrust nozzle is not being utilized.

When pressure is exerted within the chamber 30 the radially extending leg 34b of the ring member 34 is urged away from the ring collar 24 sliding on the surface 35 of the divergent section 3. Since the opposite end 34c of the ring member 34 is secured to the clamp 28 a tightening interengagement is provided between the convergent, neck and divergent sections of the thrust nozzle.

It will be noted that sealing means are provided between the moving and stationary parts of the connecting device and the thrust nozzle sections to prevent any loss of pressure medium between these surfaces. It will be appreciated further that the varying means used for securing the connecting devices to the convergent-divergent of the thrust nozzle are disclosed by way of example and other types of connecting means may be employed within the scope of the invention.

While specific embodiments of the invention have been shown and described in detail to illustrate the application of the invention principles, it will be understood that the invention may be embodied otherwise without departing from such principles.

We claim:

1. A multipart thrust nozzle construction arranged to be employed in combination with a combustion chamber in a rocket and comprising wall means forming a plurality of serially arranged axially aligned separate thrust nozzle sections, and a connecting device for securing said separate sections together comprising at least one first member secured to one of said sections and at least one second member secured to another one of said sections and cooperating with said first member to form at least a portion of a pressure chamber in which each of said first member and second member has a portion of its surface extending transversely of the axial direction of the thrust nozzle, and means for supplying pressure to the surfaces of said first and second members within the pressure chamber for urging said first and second members in opposite axial directions of said thrust nozzle and thereby urging said separate thrust nozzles sections together in tightly held engagement.

2. A multipart thrust nozzle construction as set forth in claim 1 wherein said first member has a U-sahped cross section forming the sides and end walls of the pressure chamber and said second member comprises a piston movably positionable within the pressure chamber.

3. A multipart thrust nozzle construction as set forth in claim 1 wherein said means for supplying pressure comprises a supply conduit, said second member having a passageway extending therethrough connected to said supply conduit and communicating with the pressure chamber for supplying the pressure medium into the chamber.

4. A multipart thrust nozzle construction as set forth in claim 1 wherein said means for supplying pressure comprises a spring member disposed within the pressure chamber for urging the opposed surfaces of said first member and said second member away from one another.

5. A multipart thrust nozzle construction as set forth in claim 1 wherein a plurality of said first members are made of cylindrically shaped containers each forming a piston cylinder, and one said second member disposed within each of said first containers and forming a piston movably positionable therein, and a ring-shaped supply conduit communicating with each of said containers for supplying a pressure medium thereto from a common source of supply.

6. A multipart thrust nozzle construction as set forth in claim 1, wherein said thrust nozzle construction comprises a convergent section, a neck section, and a divergent section, said neck section shaped about its circumferential ends for interengagement within the adjacent surfaces of said convergent and divergent sections, and said connecting device arranged to force said convergent and divergent sections into tightly held interengagement with the opposite ends of said neck section of said thrust nozzle.

7. A multipart thrust nozzle construction as set forth in claim 6, wherein said first member comprises a ring member having a U-shaped cross section, said second member comprises an annular-shaped piston closely fitted within and in sliding engagement with the cross-sectional sides of said ring member, a radially inner sleeve arranged in interengagement at one end with said ring-shaped member and at the other end thereof with said convergent section, and a radially outer sleeve arranged in interengagement along one end thereof with said piston and on the other end thereof with said divergent section, said piston and said ring-shaped member forming a pressure chamber within the U-shaped cross section of said ring member for tensioning said inner and outer sleeve members and urging said divergent and convergent members toward one another in tightly held interengagement with said neck portion of said thrust nozzle.

8. A multipart thrust nozzle construction as set forth in claim 7, wherein the circumferential end of said inner sleeve secured to said ring member and the circumferential end of said outer sleeve secured to said piston have a hook-shaped configuration arranged to fit within a corresponding annular-shaped recess within said ring member and piston respectively, and the opposite ends of said inner and outer sleeves having an annular-shaped recess located adjacent the end thereof, and a pair of clamp members each arranged to fit within the recess in a different one of said inner and outer sleeves, and one of said clamps attached to said convergent section and the other said clamp attached to said divergent section.

9. A thrust nozzle construction as set forth in claim 6, wherein a pair of said connecting devices are provided, one for securing member convergent section a and said neck section together and the other for securing said divergent section and said neck section, one of said connecting devices having said first member thereof comprised of a first ring collar mounted on a circumferentially extending frustoconically shaped portion of said exterior surface of said neck section an and a threaded member secured to the exterior surface of said neck section for securing said first ring collar in stationary position, and the second member thereof comprising a first ring-shaped piston member having an L-shaped cross section providing an axially extending leg and a radially extending leg relative to the axis of said thrust nozzle section, said axially extending leg interengaged within one of said divergent section and convergent section, and said radially extending leg mounted on the exterior surface of said neck section in sliding engagement therewith for affording a movably positionable piston portion relative to said first ring collar, the other said connecting device comprising a second ring collar formed integrally with said neck section and a second ring-shaped piston member having an L-shaped cross section comprising an axially extending leg and a radially extending leg with said axially extending leg thereof interengaged with one of said convergent and divergent sections and said radially extending leg thereof mounted in sliding engagement with the exterior surface of said throat section relative to said second ring collar, said first and second ring collars of said connective devices combining with said first and second piston member respectively to provide a pressure chamber within each of said connecting devices.

10. A multipart thrust nozzle construction as set forth in claim 9, wherein said thrust nozzle has a plurality of liquid coolant ducts disposed along the interior surface thereof, said neck section of said thrust nozzle having a passageway extending therethrough between said coolant liquid ducts and said pressure chambers for supplying a pressure medium into said pressure chambers for urging said piston members away from said ring collars and thereby tightly interengaging said convergent and divergent sections with said neck section of said thrust nozzle.

11. A multipart thrust nozzle construction as set forth in claim 6, wherein said first member of said connecting device comprises a ring-shaped collar, means for securing said collar to the exterior surface of one of said convergent section and divergent section, a ring-shaped piston member having an L-shaped cross section providing an axially extending leg and a radially extending leg arranged with said axially extending leg interengaged with the other one of said divergent and convergent sections and having the radially extending leg extending into sliding engagement with the exterior surface of the one of said converging and diverging section supporting said ring collar, said ring collar combining with said piston member and the exterior surface of said section of said thrust nozzle upon which it is mounted for forming the pressure chamber, and the pressure chamber adapted to contain means for urging said radially extending leg away from said ring collar thereby forcing said convergent and divergent sections into tightly held interengagement with said neck section of said thrust nozzle.

12. A multipart thrust nozzle construction as set forth in claim 11, wherein a spring member is disposed within the pressure chamber urging said ring collar and said oppositely disposed surface of said radially extending leg of said piston away from each other for affording a preload thereon for effecting the interengagement between said convergent and divergent sections and said neck section of said thrust nozzle, said thrust nozzle sections having a coolant liquid duct extending therethrough along the interior surface of said thrust nozzle for passing a coolant liquid therethrough in indirect heat exchange relationship with the atmosphere within said thrust nozzle, and a passageway extending between said coolant liquid duct and said pressure chamber for supplying coolant liquid from said duct into said pressure chamber for pressurizing the surfaces therein.